(12) United States Patent
Maurer et al.

(10) Patent No.: US 7,280,256 B2
(45) Date of Patent: Oct. 9, 2007

(54) DUST TOLERANT WINDOWLESS SCANNER

(75) Inventors: Craig A. Maurer, San Diego, CA (US); Scott F. Williams, San Diego, CA (US); Jon Lee Zimmerman, Escondido, CA (US); Jack Schmidt, Carlsbad, CA (US); Alpha Doan, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 413 days.

(21) Appl. No.: 10/627,518

(22) Filed: Jul. 24, 2003

(65) Prior Publication Data

US 2004/0017592 A1    Jan. 29, 2004

Related U.S. Application Data

(63) Continuation of application No. 09/521,192, filed on Mar. 7, 2000, now Pat. No. 6,657,751.

(51) Int. Cl.
*H04N 1/04*    (2006.01)
*H04N 1/40*    (2006.01)

(52) U.S. Cl. .................. 358/474; 358/471; 358/497; 358/498

(58) Field of Classification Search ............... 400/624; 358/474, 498, 496, 471, 473, 497, 462
See application file for complete search history.

(56) References Cited

U.S. PATENT DOCUMENTS 4,779,121 A    10/1988    Okumura
5,059,991 A    10/1991    Morisawa
5,073,795 A    12/1991    Nukaya
5,157,416 A    10/1992    Kinoshita et al.
5,434,680 A    7/1995     Noda et al.
5,537,219 A    7/1996     Morikawa et al.
5,661,297 A    8/1997     Aleshire et al.
5,717,505 A    2/1998     Chang et al.
5,729,793 A    3/1998     Inoue
5,833,381 A *  11/1998    Kellogg et al. ............. 400/624
5,844,697 A    12/1998    Omvik et al.
5,959,746 A    9/1999     Tsai

* cited by examiner

*Primary Examiner*—Houshang Safaipour (57) ABSTRACT

A dust tolerant scanner without a transparent plate to support objects scanned by its media scan assembly. Other dust or debris collecting surfaces in the optical path of the scanner are positioned as far away as possible from an object focal plane of the media scan assembly. The media scan assembly includes upper and lower document feeder portions which define a media path adjacent to a reference surface of the upper portion. The lower document feeder portion includes a media conformance member which positions pieces of media against the reference surface as the pieces of media are advanced along the media path. The media conformance member includes ramp portions and an aperture which provides an optical path between the object focal plane and a sensor focal plane within the scanner.

19 Claims, 7 Drawing Sheets

DUST TOLERANT WINDOWLESS SCANNER

CROSS-REFERENCE TO RELATED APPLICATIONS

This application is a continuation of U.S. patent application Ser. No. 09/521,192 filed on Mar. 7, 2000 now U.S. Pat. No. 6,657,751.

BACKGROUND OF THE INVENTION

1. Field of Invention

The present invention relates generally to a dust tolerant windowless scanner and, more specifically, to a dust tolerant windowless scanner and its media scan assembly.

2. Description of the Related Art

Scanners typically include an array of optical sensor elements and a scan area (e.g., plate of glass) where an object to be imaged by the sensor elements is positioned. An optical path including, for example, lenses and mirrors, spans between the sensor elements and the scan area.

Figure 3:
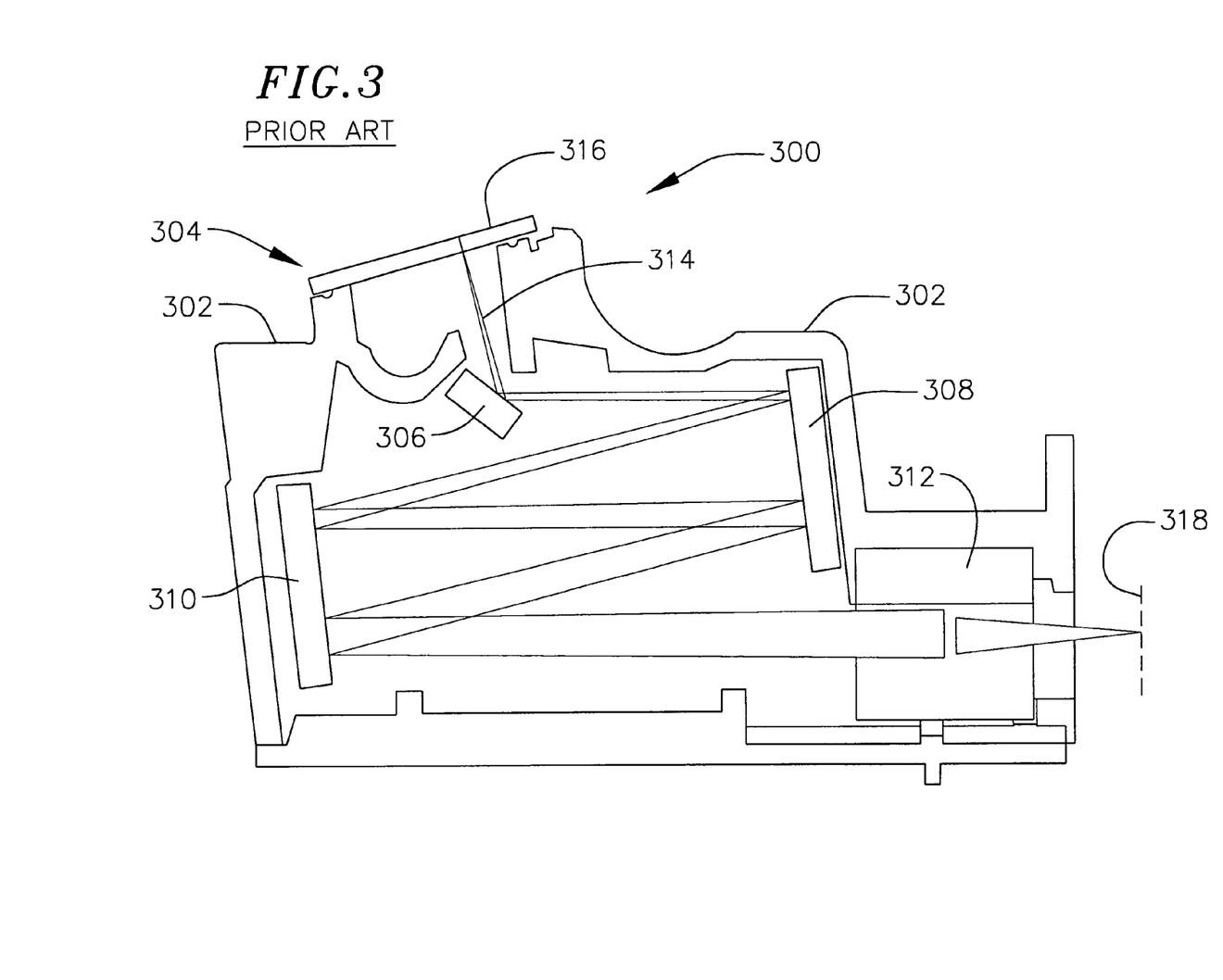
FIG. 3 is a cross-sectional side view of a conventional scanner.

Referring to FIG. 3, a conventional scanner 300 includes a main housing 302, a glass plate 304, mirrors 306, 308, 310 and a lens 312 configured as shown. An optical path 314 of the scanner 300 begins at an object focal plane 316 at the top surface of the glass plate 304, reflects from the mirrors 306, 308, 310 as shown, and passes through the lens 312 to end at the sensor focal plane 318 (shown with a dashed line).

The scanner 300, as well as other conventional sheet fed facsimile and All-in-One products, employs the glass plate 304 for the object being scanned to reference against while the object is in the scan zone. The object to be scanned is moved over the object focal plane 316 by employing, for example, a conventional automatic document feeder (not shown).

A problem with the conventional scanner 300 is that the glass plate 304 must be positioned at or very near the object focal plane 316 in order for the glass plate 304 to fulfill its intended purpose of document support. Unfortunately, the positioning of the glass plate 304 in this manner provides locations (on both sides of the glass plate 304) very near the object focal plane 316 for dust or debris to accumulate. The scanner 300 is therefore highly sensitive to any small piece of dust or debris, resulting in streaks (typically, vertical streaks) on the scanned image in the direction of paper motion. Moreover, dust or debris on the reflecting surface of the mirror 306 may also be imaged due to its close proximity (e.g., 15 mm) to the object focal plane 316. The term "dust or debris" means optical obstructions which may effect the transmission of light and includes, but is not limited to, paper dust, plastic dust, skin particles, metal particles, glass particles and fibers.

Although dust or debris on the top surface of the glass plate 304 can be easily removed, it is difficult to clean dust or debris from the inside of the scanner 300 particularly after the scanner 300 has been assembled. As a result, the scanner 300 is typically built on a "clean line" to lessen the number of product returns. This, of course, increases the manufacturing cost of the conventional scanner 300. Thus, a need exists for a low cost dust tolerant scanner which is less sensitive to particle contamination.

SUMMARY OF THE INVENTION

The principles of the present invention are applicable, generally, to a dust tolerant windowless scanner and its media scan assembly. According to the present invention, the scanner is windowless (or "open"), thus preventing dust or debris from accumulating at or near the object focal plane. Additionally, any dust or debris collecting surface, e.g., a mirror, along the optical path of the scanner is positioned as far from the object focal plane as possible.

In an exemplary preferred embodiment, by positioning the internal mirrors as far from the object focal plane as possible and removing the glass plate from the scanner entirely, dust or debris no longer has a surface to attach itself on or near the object focal plane. The scanner of the present invention is less sensitive to particle contamination and eliminates vertical streaks caused by dust or debris at or near the object focal plane, resulting in significantly improved scan quality.

The dust and debris tolerant scanner design of the present invention also provides manufacturing advantages. For example, the scanner of the present invention can be built in a non-clean room environment which reduces manufacturing overhead. Additionally, the scanner of the present invention eliminates parts from the assembly such as the glass plate, adhesives for the glass plate and any dust covers.

The media scan assembly for the dust tolerant windowless scanner includes upper and lower document feeder portions which define a media path adjacent to a reference surface of the upper portion. The lower document feeder portion includes a media conformance member which positions pieces of media against the reference surface as the pieces of media are advanced along the media path. The media conformance member includes ramp portions and an aperture which provides an optical path between the object focal plane within the media scan assembly and the sensor focal plane within the scanner.

A dust tolerant scanner in accordance with one embodiment of the present invention includes a housing, a document feeder mechanically coupled to the housing, and a media conformance member. The housing includes optics which define an optical path between an object focal plane and a sensor focal plane. The document feeder includes a reference surface positioned adjacent to the object focal plane, provides a, media path through the object focal plane, and is configured to advance media along the media path. The media conformance member is mechanically coupled to the housing and positioned adjacent the reference surface. The media conformance member includes an aperture through which the optical path extends and is formed such that media advanced by the document feeder along the media path is biased toward the reference surface.

A media scan assembly for a dust tolerant scanner in is accordance with another embodiment of the present invention includes: an upper document feeder portion and a lower document feeder portion providing a media path, the upper document feeder portion including a reference surface adjacent the media path, the lower document feeder portion including an aperture facing the reference surface, the lower document feeder portion being configured to be attached to a main housing of the scanner; and at least one drive roller configured to advance media along the media path.

A media scan assembly for a dust tolerant scanner in accordance with another embodiment of the present invention includes: an upper document feeder portion and a lower document feeder portion defining a media path, the lower document feeder portion including a media conformance member shaped to push a piece of media against the upper document feeder portion, the media conformance member including an aperture shaped to provide an optical path to the media path; and a media driver configured to reposition media along the media path.

A media scan assembly for a dust tolerant scanner in accordance with another embodiment of the present invention includes: an upper document feeder portion and a lower document feeder portion defining a media path, the upper document feeder portion and the lower document feeder portion being configured to advance media along the media path, the upper document feeder portion including a reference surface, the lower document feeder portion including an aperture facing the reference surface, the media path being configured to push a piece of media in the media path against the reference surface, the aperture providing an optical path to the media path.

The above described and many other features and attendant advantages of the present invention will become apparent as the invention becomes better understood by reference to the following detailed description when considered in conjunction with the accompanying drawings.

BRIEF DESCRIPTION OF THE DRAWINGS

Detailed description of preferred embodiments of the invention will be made with reference to the accompanying drawings.

DETAILED DESCRIPTION OF THE PREFERRED EMBODIMENTS

The following is a detailed description of the best presently known mode of carrying out the invention. This description is not to be taken in a limiting sense, but is made merely for the purpose of illustrating the general principles of the invention.

Figure 1:
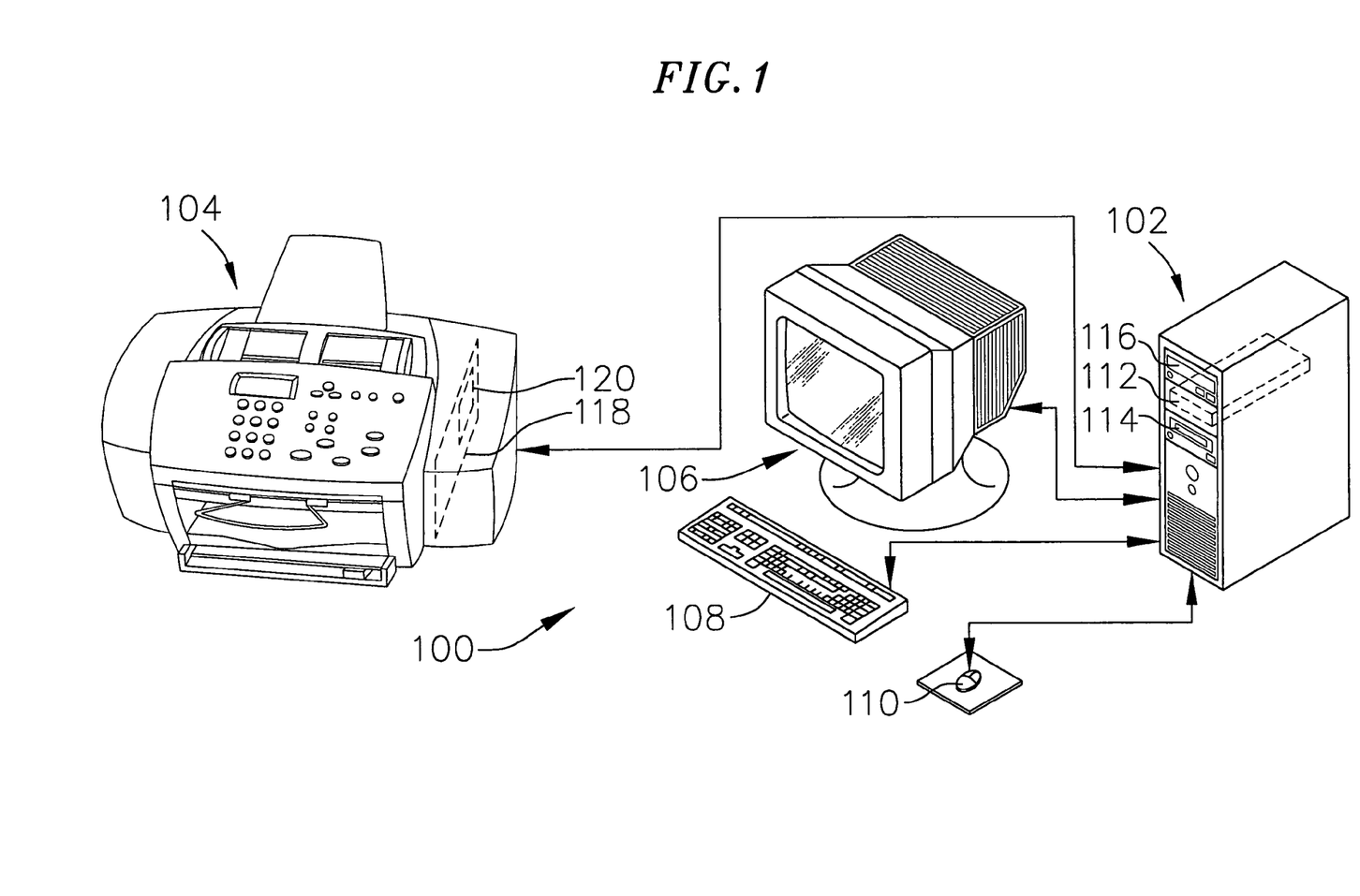
FIG. 1 is a perspective view of a system including a personal computer and a sheet fed scanner, the system being configured to employ the principles of the present invention.

FIG. 1 shows a system 100 configured to employ the principles of the present invention. The system 100 includes a computer 102, scanner 104, monitor 106 and various user-input devices such as a keyboard 108 and a mouse 110 functionally interconnected as shown. The computer 102 comprises, for example, a personal computer ("PC") with a hard drive 112 (shown with dashed lines), a disk drive 114 and a CD-ROM drive 116. An exemplary preferred scanner 104 comprises an "All-In-One" product such as the HP OfficeJet T Series (T45/65) which provides integrated printing, faxing, scanning and copying functions, all in color. The scanner 104 includes a circuit card 118 with firmware 120 (both shown with dashed lines). Algorithms utilized by the scanner 104 can be stored in the firmware 120. It should be understood that other system configurations can be employed.

Figure 2:
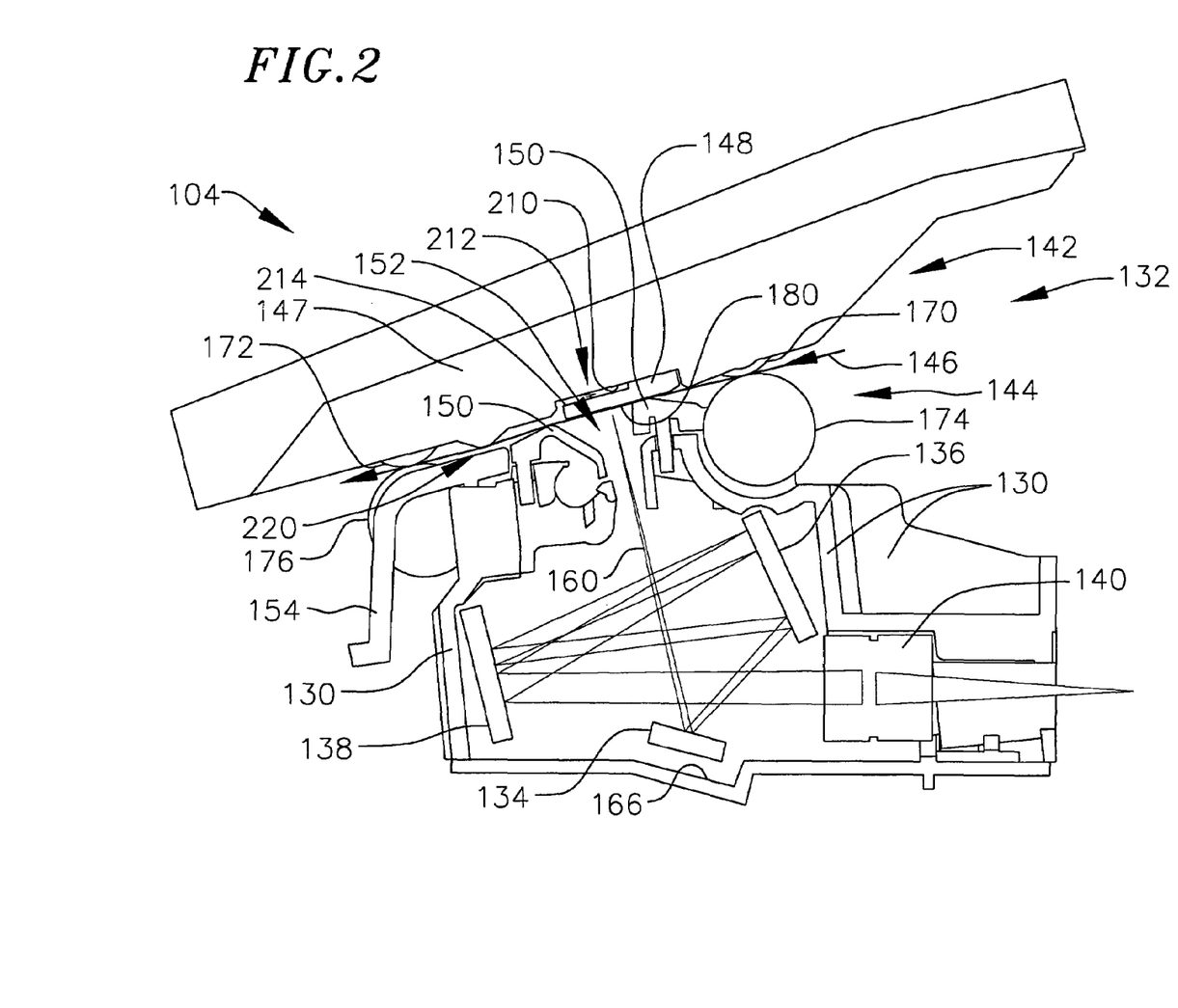
FIG. 2 is a cross-sectional side view of the sheet fed scanner of FIG. 1.

Referring to FIG. 2, an exemplary preferred scanner 104 includes a scanner chassis 130 and a media scan assembly 132. The scanner chassis 130 serves as a main housing for optics which, in the illustrated preferred scanner 104, include mirrors 134, 136, 138 and a lens 140 configured as shown. An exemplary preferred media scan assembly 132 includes an upper document feeder portion 142 and a lower document feeder portion 144 which define a media path 146. The upper document feeder portion 142 includes an upper document feeder chassis 147 and a reference surface member 148 adjacent the media path 146. The lower document feeder portion 144 includes a media conformance member 150 with an aperture 152 which faces the reference surface member 148. The lower document feeder portion 144 includes a lower document feeder chassis 154 and is attached to the scanner chassis 130 as shown. The upper document feeder portion 142 is mechanically coupled to the lower document feeder portion 144, for example, in the same manner accomplished in conventional automatic document feeders.

Figure 4:
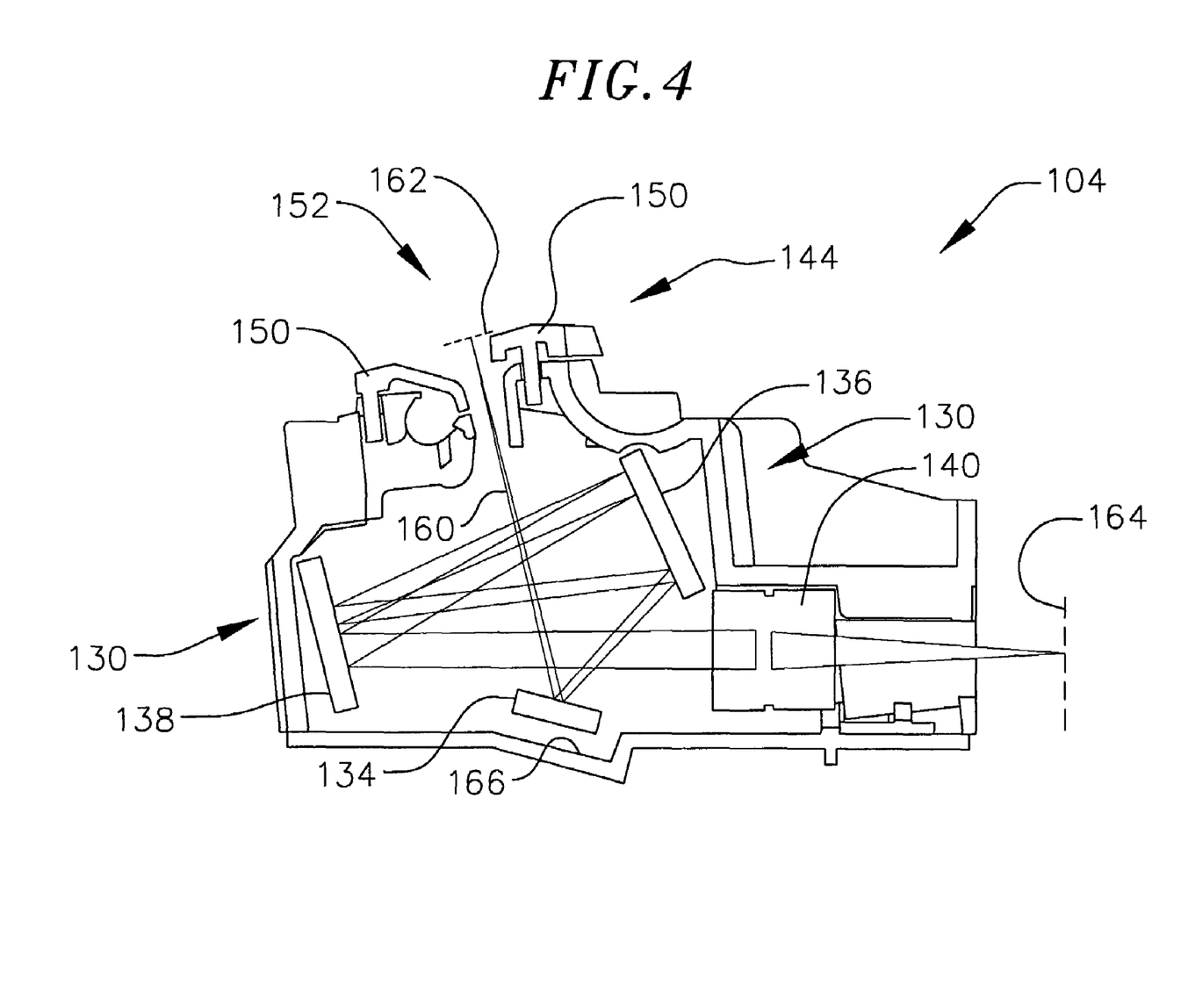
FIG. 4 is a cross-sectional side view of the sheet fed scanner of FIG. 2 with its upper document feeder portion, lower document feeder chassis and drive rollers removed.

Referring to FIG. 4, an optical path 160 of the scanner 104 begins at an object focal plane 162 (shown with a dashed line) above the media conformance member 150, reflects from the mirrors 134, 136, 138 as shown, and passes through the lens 140 to end at the sensor focal plane 164 (shown with a dashed line). A sensing device (not shown) is positioned with its sensing elements aligned along the sensor focal plane 164. An exemplary preferred sensing device comprises a conventional charge coupled device ("CCD") image sensor.

The further dust or debris is from the object focal plane 162 along the optical path 160, the less likely it is to image. Thus, according to the present invention, surfaces along the optical path 160 (between the object focal plane 162 and the lens 140) which are capable of collecting dust or debris are preferably positioned as far as possible from the object focal plane 162. Generally, the mirror 134 is positioned on an opposite side of the scanner housing from the object focal plane 162. In the illustrated exemplary preferred scanner 104, the mirror 134 is positioned as shown in a recess 166 formed in the bottom of the scanner chassis 130. By way of example, the reflecting surface of the mirror 134 is approximately 45 mm away from the object focal plane 162, the unfolded length of the optical path 160 is approximately 280 mm, and the diameter of the pupil of the lens 140 is approximately 4 mm. It should be appreciated that the principles of the present invention are equally applicable to other optical path and scanner chassis configurations.

In an exemplary preferred scanner 104, the mirror 134 is not positioned directly below the aperture 152, but somewhat to the rear of the aperture 152 as shown. By offsetting the position of the mirror 134 from the downward path of dust or debris falling through the aperture 152, the likelihood of imaging dust or debris is further minimized. The scope of the present invention additionally contemplates the elimination of all surfaces capable of collecting dust or debris between the object focal plane 162 and the lens 140.

Referring to FIG. 2, the media scan assembly 132 is configured to advance media along the media path 146 and preferably provides the functionality of an automatic document feeder. In the illustrated media scan assembly 132, the upper document feeder portion 142 includes a prescan pinch roller 170 and a postscan pinch roller 172 configured as shown. In a complementary fashion, the lower document feeder portion 144 includes a prescan drive roller 174 and a postscan drive roller 176. Alternatively, the upper document feeder portion 142 can be configured with drive rollers and the lower document feeder portion 144 with pinch rollers. Thus, the pinch rollers 170, 172 and the drive rollers 174, 176 provide a drive mechanism for advancing media along the media path 146.

According to the present invention, the media path 146 is configured to push a piece of media (such as a sheet of paper) in the media path 146 against the upper document feeder portion 142. In the illustrated exemplary preferred embodiment, the media conformance member 150 biases media advanced along the media path 146 toward a reference surface 180 of the reference surface member 148. Generally, this is accomplished by providing ramp portions on opposing ends of the media conformance member 150.

Figure 5:
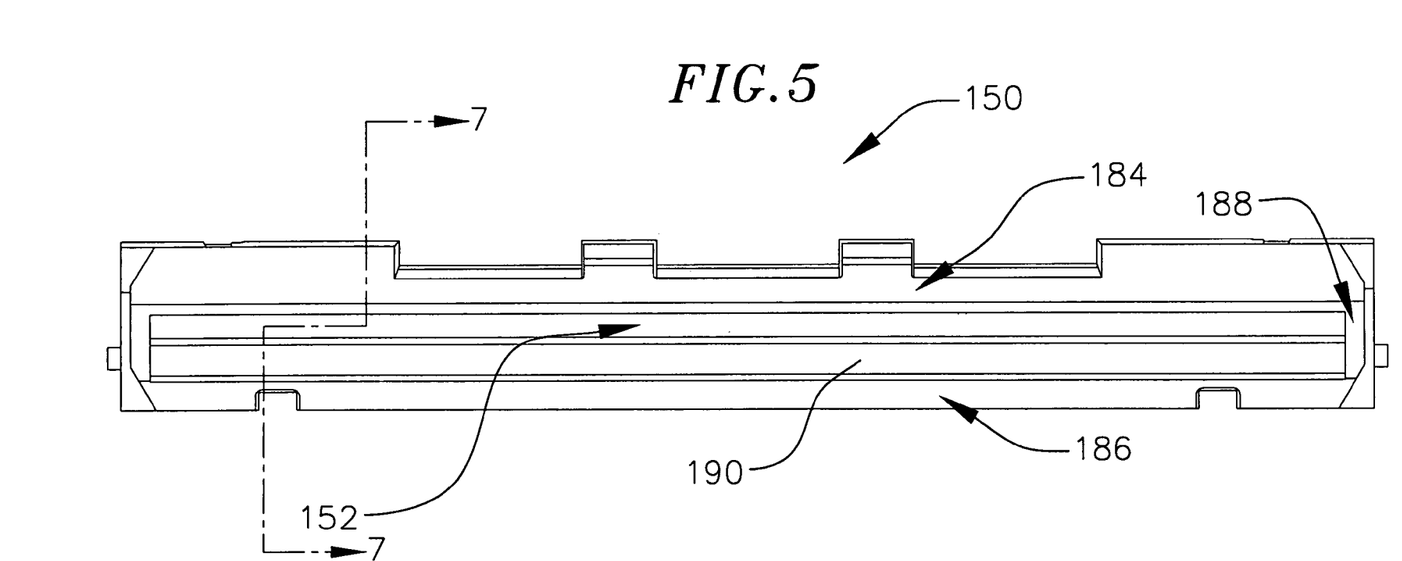
FIGS. 5 and 6 are top and front views, respectively, of an exemplary preferred media conformance member of the sheet fed scanner of FIG. 1.
Figure 6:
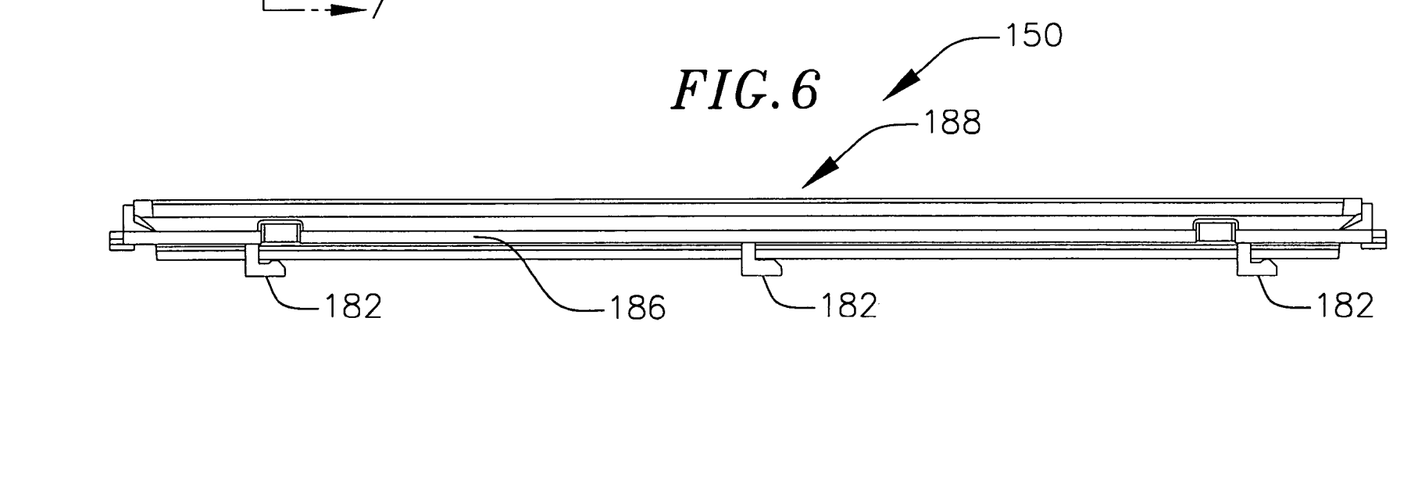
Figure 7:
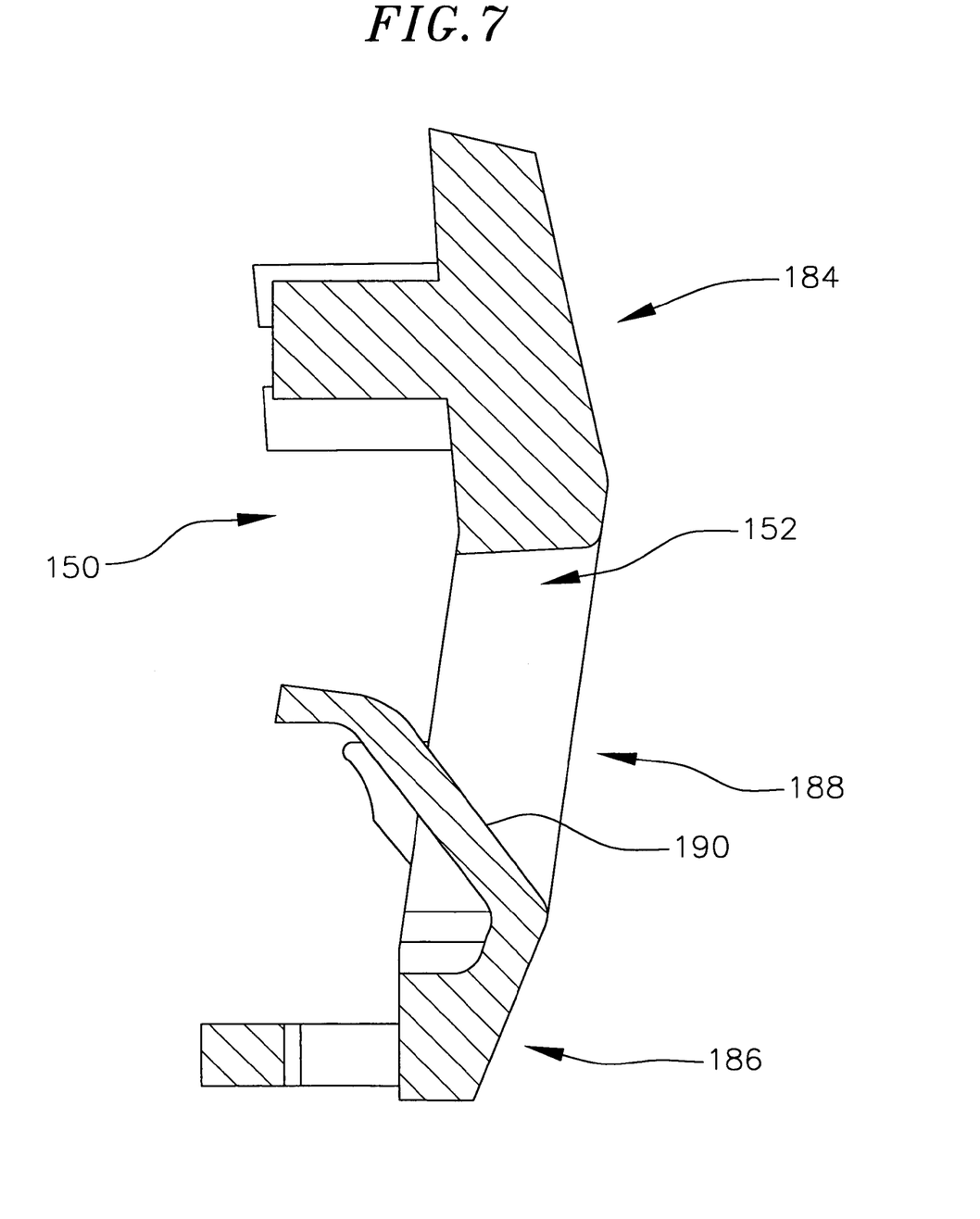
FIG. 7 is an enlarged side view of the media conformance member along line 7-7 of FIG. 5.
Figures 8, 9, 10, 11:
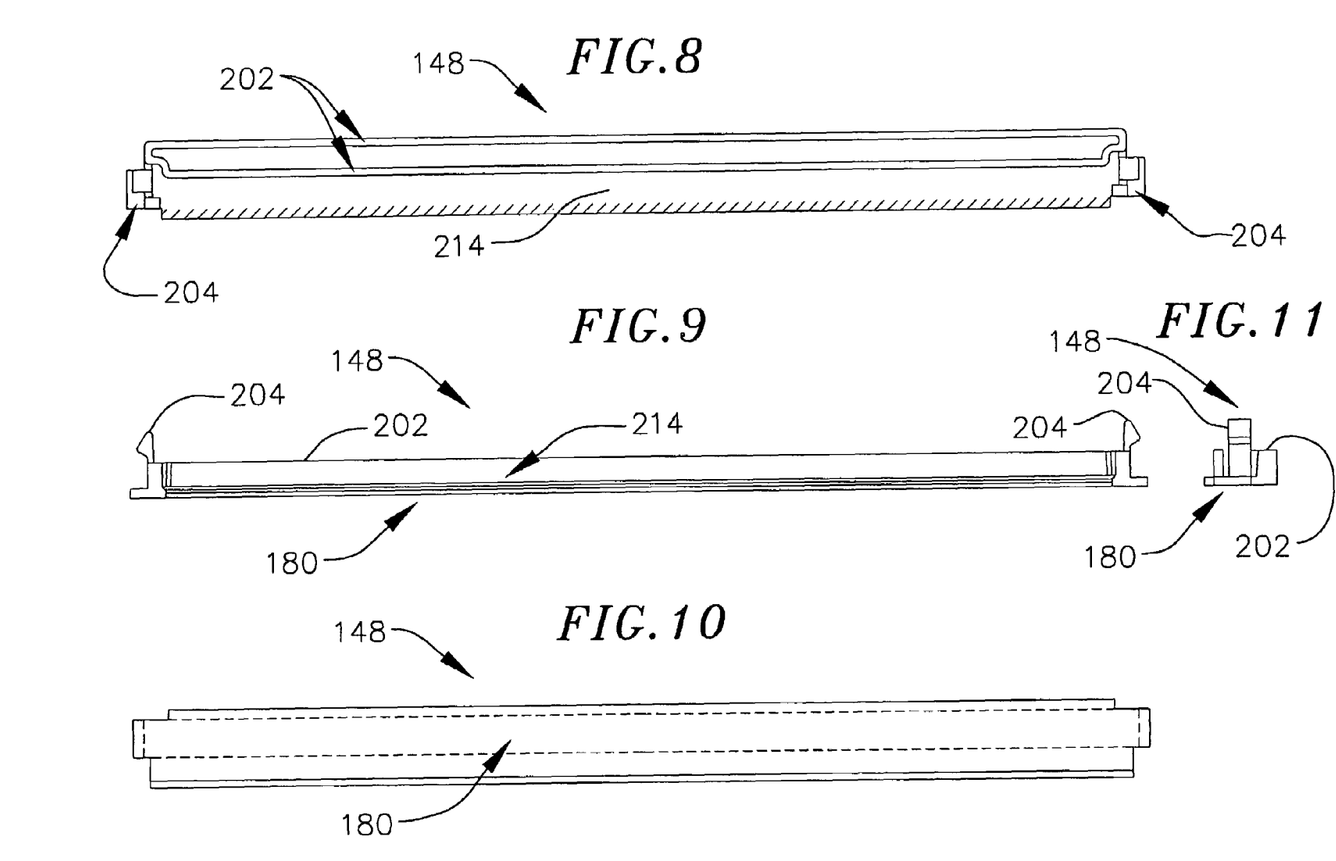
FIGS. 8, 9, 10 and 11 are top, front, bottom and side views, respectively, of an exemplary preferred reference surface member of the sheet fed scanner of FIG. 1.

Referring to FIGS. 5-7, an exemplary preferred media conformance member 150 is formed as shown. The media conformance member 150 is preferably transparent so as not to present an optical obstruction to a light source (not shown) near the object focal plane 162. The media conformance member 150 can be formed from a variety of materials such as plastic. An exemplary preferred media conformance member 150 is formed from clear plastic.

The illustrated media conformance member 150 includes six cantilevered latching members 182 (only the front three are visible in FIG. 6) which facilitate mechanical coupling of the media conformance member 150 to the scanner chassis 130. As best shown in FIG. 7, an exemplary preferred media conformance member 150 includes ramp portions 184, 186 and a top portion 188. The aperture 152 in the top portion 188 spans across the entire scan zone thereby allowing the optical path 160 to pass through the media conformance member 150 without obstruction.

In operation, a piece of media is advanced along the media path 146 and first comes into contact with the ramp portion 184 of the media conformance member 150. The angle of the ramp portion 184 biases the piece of media toward the reference surface 180. After the piece of media passes over the aperture 152, it comes into contact with the peak of the other ramp portion 186. Should the front edge of the piece of media curl downward, an inclined surface 190 of the ramp portion 186 catches the piece of media and advances the piece of media along the media path 146.

Referring to FIGS. 8-11, an exemplary preferred reference surface member 148 is formed as shown. Preferably, the reference surface member 148 spans across the entire scan zone and is substantially uniform in color so that it can be used for calibrating sensing element outputs. The reference surface member 148 can be formed from a variety of materials such as plastic. An exemplary preferred reference surface member 148 is formed from white plastic. The reference surface member 148 can be made, for example, by employing conventional gas assisted molding or injection molding processes.

The illustrated reference surface member 148 includes a top surface 202 and latching members 204 formed as shown. The latching members 204 are used to mechanically couple the reference surface member 148 to the upper document feeder chassis 147. Referring also to FIG. 2, the upper document feeder portion 142 includes an inner surface 210 which is sized to receive the reference surface member 148 therein as shown. A spring 212 (or springs) is positioned between the upper document feeder chassis 147 and a complementary surface 214 (FIG. 8) of the reference surface member 148. The spring(s) 212 mechanically positions the reference surface 180 against the top portion 188 of the media conformance member 150. Either the reference surface member 148 or the top portion 188 of the media conformance member 150 may optionally incorporate standoffs to locate the reference surface 180 at a fixed distance from the top portion 188 of the media conformance member 150, thus forming a small gap for the media to fit through. It should be noted, however, that the gap is not necessary and the illustrated embodiment does not use standoffs.

In a preferred embodiment, the upper document feeder chassis 147 also includes a raised portion 220 which is positioned adjacent the reference surface 180 and, as shown in FIG. 2, after the reference surface 180 along the media path 146. The raised portion 220 functions to curl a piece of media upward to prevent the back edge of the piece of media from falling into the aperture 152.

In lieu of employing the raised portion 220, the postscan pinch roller 172 can be repositioned slightly to the left of the drive roller 176 (as shown in FIG. 2) to "aim" the back edge of a piece of media upward. Similarly, on the other side of the aperture 152, the prescan pinch roller 170 can be repositioned slightly to the right of the drive roller 174 (as shown in FIG. 2) to "aim" the piece of media upward.

Although the present invention has been described in terms of the preferred embodiment above, numerous modifications and/or additions to the above-described preferred embodiment would be readily apparent to one skilled in the art. It is intended that the scope of the present invention extends to all such modifications and/or additions.

We claim:

1. A dust tolerant scanner, comprising:
   a housing including optics which define an optical path between an object focal plane and a sensor focal plane;
   a document feeder mechanically coupled to the housing, the document feeder including a reference surface positioned adjacent the object focal plane, the document feeder providing a media path through the object focal plane, the document feeder being configured to advance media along the media path; and
   a media conformance member mechanically coupled to the housing and positioned adjacent the reference surface, the media conformance member including an aperture through which the optical path extends without obstruction such that dust or debris can fall through the aperture, the media conformance member being formed such that media advanced by the document feeder along the media path is biased toward the reference surface.

2. A dust tolerant scanner as claimed in claim 1, wherein the optics include a mirror positioned at an opposite side of the housing from the object focal plane.

3. A dust tolerant scanner as claimed in claim 2, wherein the mirror is a dust or debris collecting surface.

4. A dust tolerant scanner as claimed in claim 1, wherein the document feeder is an automatic document feeder.

5. A dust tolerant scanner as claimed in claim 1, wherein the media conformance member includes a ramp portion adjacent the aperture.

6. A media scan assembly for a dust tolerant scanner, the media scan assembly comprising:
   an upper document feeder portion and a lower document feeder portion providing a media path, the upper document feeder portion including a reference surface adjacent the media path, the lower document feeder portion including a media conformance member formed such that media advanced along the media path is biased toward the reference surface, the media conformance member including an aperture facing the reference surface, the aperture providing an optical path to the media path and being formed such that dust or debris can fall through the aperture, the lower document feeder portion being configured to be attached to a main housing of the scanner; and at least one drive roller configured to advance media along the media path.

7. A media scan assembly as claimed in claim 6, wherein the upper document feeder portion includes a spring which mechanically couples the reference surface to the upper document feeder portion.

8. A media scan assembly as claimed in claim 6, wherein the upper document feeder portion includes a raised portion adjacent the reference surface.

9. A media scan assembly as claimed in claim 8, wherein raised portion is positioned after the reference surface along the media path.

10. A media scan assembly as claimed in claim 6, wherein the reference surface is white.

11. A media scan assembly as claimed in claim 6 wherein the media conformance member includes at least one ramp portion.

12. A media scan assembly as claimed in claim 6, wherein the at least one drive roller is mechanically coupled to the lower document feeder portion.

13. A media scan assembly for a dust tolerant scanner, the media scan assembly comprising:

an upper document feeder portion and a lower document feeder portion defining a media path, the lower document feeder portion including a media conformance member shaped to push a piece of media against the upper document feeder portion, the media conformance member including an aperture shaped to provide an optical path to the media path and such that dust or debris can fall through the aperture; and a media driver configured to reposition media along the media path.

14. A media scan assembly as claimed in claim 13, wherein the upper document feeder portion includes a reference surface which faces the aperture.

15. A media scan assembly as claimed in claim 14, wherein the reference surface is substantially uniform in color.

16. A media scan assembly as claimed in claim 14, wherein the media conformance member includes a top portion facing the reference surface and a ramp portion adjacent the top portion.

17. A media scan assembly for a dust tolerant scanner, the media scan assembly comprising:

an upper document feeder portion and a lower document feeder portion defining a media path, the upper document feeder portion and the lower document feeder portion being configured to advance media along the media path, the upper document feeder portion including a reference surface, the lower document feeder portion including a media conformance member configured to push a piece of media in the media path against the reference surface, the media conformance member including an aperture facing the reference surface, the aperture providing an optical path to the media path and being formed such that dust or debris can fall through the aperture.

18. A media scan assembly as claimed in claim 17, wherein the lower document feeder portion includes an angled surface which is positioned before the reference surface along the media path.

19. A media scan assembly as claimed in claim 17, wherein the upper portion includes a raised surface which is positioned after the reference surface along the media path.

* * * * *